United States Patent
Winston et al.

(10) Patent No.: US 9,086,018 B2
(45) Date of Patent: Jul. 21, 2015

(54) STARTING A GAS TURBINE ENGINE TO MAINTAIN A DWELLING SPEED AFTER LIGHT-OFF

(75) Inventors: Kenneth W. Winston, San Diego, CA (US); Andre M. Ajami, Spring Valley, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1065 days.

(21) Appl. No.: 12/765,916

(22) Filed: Apr. 23, 2010

(65) Prior Publication Data

US 2011/0259016 A1    Oct. 27, 2011

(51) Int. Cl.
*F02C 7/26* (2006.01)
*F02C 9/28* (2006.01)
*F02K 9/95* (2006.01)
*F02C 7/262* (2006.01)

(52) U.S. Cl.
CPC . *F02C 7/26* (2013.01); *F02C 7/262* (2013.01); *F02C 9/28* (2013.01); *F02K 9/95* (2013.01); *F05B 2220/50* (2013.01)

(58) Field of Classification Search
CPC ............ F02C 7/26; F02C 7/262; F02C 7/264; F02C 7/266; F02C 7/268; F02C 7/27; F02C 7/275; F02C 7/277; F02C 9/28; F05B 2220/50; F02K 9/95
USPC ................. 60/39.13, 772, 776, 778, 786, 788; 244/53 A
See application file for complete search history.

(56) References Cited

U.S. PATENT DOCUMENTS

| | | | |
|---|---|---|---|
| 3,606,754 A | 9/1971 | White | |
| 3,971,210 A | 7/1976 | Rose | |
| 4,121,419 A | 10/1978 | Kuznetsov et al. | |
| 4,201,922 A | 5/1980 | Douglas | |
| 4,274,255 A | 6/1981 | Pollak | |
| 4,325,123 A * | 4/1982 | Graham et al. | 701/110 |
| 5,042,246 A * | 8/1991 | Moore et al. | 60/773 |
| 5,107,674 A | 4/1992 | Wibbelsman et al. | |
| 5,123,239 A | 6/1992 | Rodgers | |
| 5,127,220 A | 7/1992 | Jesrai et al. | |
| 5,247,797 A | 9/1993 | Fric et al. | |
| 5,309,707 A | 5/1994 | Provol et al. | |
| 5,430,362 A * | 7/1995 | Carr et al. | 318/779 |
| 5,481,865 A * | 1/1996 | Frutschi | 60/773 |
| 5,661,967 A * | 9/1997 | Farkas et al. | 60/774 |
| 5,722,228 A | 3/1998 | Lampe et al. | |
| 5,927,064 A | 7/1999 | Dyer et al. | |
| 6,035,626 A * | 3/2000 | Wahl et al. | 60/773 |
| 6,062,016 A * | 5/2000 | Edelman | 60/778 |
| 6,070,404 A * | 6/2000 | Bosley et al. | 60/772 |

(Continued)

OTHER PUBLICATIONS

Backus, Richard. "Should I Let My Car Warm Up Each Morning?". Mother Earth News. http://www.motherearthnews.com/green-transportation/car-engine-warm-up.aspx, Oct. 1, 2008.*

*Primary Examiner* — Phutthiwat Wongwian
*Assistant Examiner* — Michael B Mantyla
(74) *Attorney, Agent, or Firm* — Carlson, Gaskey & Olds, P.C.

(57) ABSTRACT

A method of starting a gas turbine engine includes maintaining the gas turbine engine at the dwelling speed after light-off until a predetermined magnitude of combustor warm-up is determined then increasing the speed of the starter motor to accelerate the gas turbine engine after the predetermined magnitude of combustor warm-up is achieved.

12 Claims, 5 Drawing Sheets

(56) References Cited

U.S. PATENT DOCUMENTS

| | | | |
|---|---|---|---|
| 6,109,018 A | 8/2000 | Rostrup-Nielsen et al. | |
| 6,182,438 B1 | 2/2001 | Weber | |
| 6,269,625 B1 | 8/2001 | Dibble et al. | |
| 6,370,861 B1 * | 4/2002 | Box | 60/778 |
| 6,766,647 B2 | 7/2004 | Hartzheim | |
| 6,810,676 B2 * | 11/2004 | O'Connor | 60/778 |
| 6,810,677 B2 | 11/2004 | Dewis | |
| 6,836,086 B1 | 12/2004 | Goldberg et al. | |
| 6,941,760 B1 | 9/2005 | Jones | |
| 6,988,368 B2 | 1/2006 | O'Connor | |
| 7,093,422 B2 | 8/2006 | Ponziani et al. | |
| 7,095,601 B2 | 8/2006 | Mehrer et al. | |
| 7,204,090 B2 | 4/2007 | O'Connor | |
| 7,242,195 B2 | 7/2007 | Ponziani et al. | |
| 7,253,535 B2 | 8/2007 | Duesterhoeft | |
| 7,281,382 B2 | 10/2007 | Plimpton et al. | |
| 7,302,334 B2 | 11/2007 | Hook et al. | |
| 7,367,193 B1 | 5/2008 | Thompson | |
| 7,434,406 B2 | 10/2008 | Herlihy et al. | |
| 7,509,812 B2 | 3/2009 | Mehrer et al. | |
| 7,565,793 B2 | 7/2009 | Shelby et al. | |
| 2007/0084214 A1 | 4/2007 | Schmidt et al. | |
| 2010/0012434 A1 * | 1/2010 | Pisseloup | 184/6.11 |
| 2011/0094241 A1 * | 4/2011 | Rodd et al. | 60/778 |

* cited by examiner

STARTING A GAS TURBINE ENGINE TO MAINTAIN A DWELLING SPEED AFTER LIGHT-OFF

BACKGROUND

The present disclosure relates to a gas turbine engine, and more particularly to a method of starting an auxiliary power unit with a combustor warm-up cycle.

A start sequence for a gas turbine engine, for example, one used in an auxiliary power unit (APU), coordinates engine speed, ignition and fuel delivery to achieve a reliable start. A starter motor is coupled to the gas turbine engine and is operated to produce rotation thereof. As the starter motor accelerates the engine, a fuel delivery pump provides fuel flow thereto. Igniters are then actuated to effect ignition in a combustor section. Upon successful ignition, and once the engine has reached a self-sustaining speed, the starter motor is disengaged or operated as a generator.

Under some conditions such as high altitudes, cold temperatures or combinations thereof, the gas turbine engine may flame-out. At the extremes of altitudes and cold inlet air temperatures, the likelihood of a start failure increases.

SUMMARY

A method of starting a gas turbine engine according to an exemplary aspect of the present disclosure includes controlling a speed of a starter motor during a start sequence to drive a gas turbine engine at a dwelling speed. Maintaining the gas turbine engine at the dwelling speed after light-off until a predetermined magnitude of combustor warm-up is determined. Increasing the speed of the starter motor to accelerate the gas turbine engine after the predetermined magnitude of combustor warm-up is achieved.

A method of starting a gas turbine engine according to an exemplary aspect of the present disclosure includes controlling a speed of a starter motor during a start sequence to drive a gas turbine engine at a dwelling speed. Maintaining the gas turbine engine at the dwelling speed after light-off until an Exhaust Gas Temperature (EGT) obtains a predetermined temperature. Increasing the speed of the starter motor to accelerate the gas turbine engine after the predetermined temperature is achieved.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
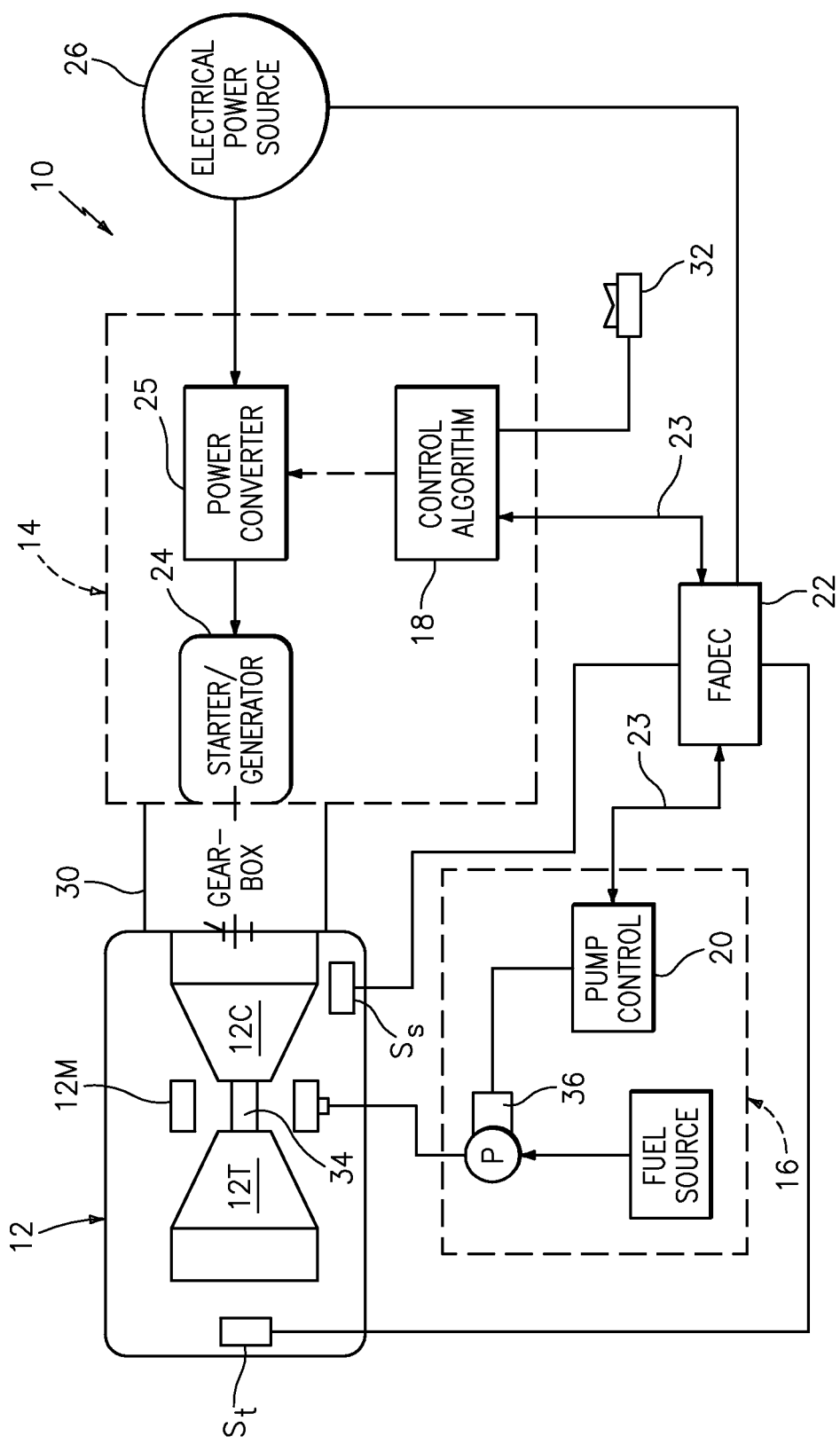
FIG. 1 is a schematic block diagram of a gas turbine engine starting system according to the present invention.

FIG. 1 illustrates a general schematic view of an auxiliary power unit (APU) 10. The APU 10 generally includes a gas turbine engine 12, a starter generator system 14 and a fuel system 16. The gas turbine engine 12 generally includes a compressor section 12C, a turbine section 12T and a combustor section 12M. In general, the compressor section 12C pumps air into the combustor section 12M so that the combustor section 12M burns fuel in a high pressure environment. The burning fuel in the combustor section 12M heats the air prior to communication through the turbine section 12T. The products of combustion which are expanded through the turbine section 12T above idle fuel flow rate develop more power than needed to drive the cycle compressor section 12C such that some air (referred to as "bleed air") can be drawn off and used as a pneumatic output to power other devices. Alternatively, the power can be used to drive a load compressor that compresses air in a separate stage, drives other systems, or provides combinations thereof.

The starter generator system 14 and the fuel system 16 may include independent controllers 18, 20 which may be implemented by a suitably programmed microprocessor or any other processing device, together with any interface apparatus and sensors therefor necessary to control the respective systems 14, 16. Although schematically illustrated separately, the controllers 18, 20 may be combined into a single APU controller. The controllers 18, 20 may additionally or alternatively communicate with each other through a higher level central controller such as a full authority digital electronic control (FADEC) 22. The controllers 18, 20, 22 communicate over a communication bus or the like (illustrated schematically at 23). The controllers 18, 20, 22 may include closed loop feedback systems having linear control system logic such as proportional, integral, derivative (PID) paths to achieve the desired response and compensate for undesired destabilization forces. It should be understood that various controller and sensor arrangements may be utilized herewith.

The starter generator system 14 generally includes a starter motor 24 that receives electrical power through a power converter 25 from an electrical power source 26 such as a battery, AC power source, DC power source, or combinations thereof. The starter motor 24 may be a brushless DC starter motor, an AC motor, a Switched Reluctance motor, or combinations thereof connected to a rotor 34 of the gas turbine engine 12 through a gearbox 30 to provide torque thereto and receive torque therefrom. Alternatively, it should be understood that the starter motor 24 may directly rotate the rotor 34 without an intermediate gearbox, clutch or the like. Once the gas turbine engine 12 achieves operating speed, the starter motor 24 may be operated as an electrical generator to power various loads and systems.

The starter motor 24 is responsive to signals supplied by the starter system controller 18 and the FADEC 22. The FADEC 22 communicates with a sensor suite, such as a speed sensor Ss which senses the speed of the rotor 34 and a temperature sensor St which senses the exhaust gas temperature (EGT) of the gas turbine engine 12. It should be understood the sensor suite may additionally, or in the alternative, utilize other sensors. The starter system controller 18 is further responsive to a command signal which may be developed through actuation of a switch 32 which initiates or terminates a start sequence.

The fuel system 16 generally includes a pump motor 36 which communicates with the fuel system controller 20 to drive a fuel pump 36 at variable speeds to supply fuel to the combustor section 12M of the gas turbine engine 12. The fuel system 16 is responsive to signals supplied by the pump system controller 20 and the FADEC 22.

Figure 2:
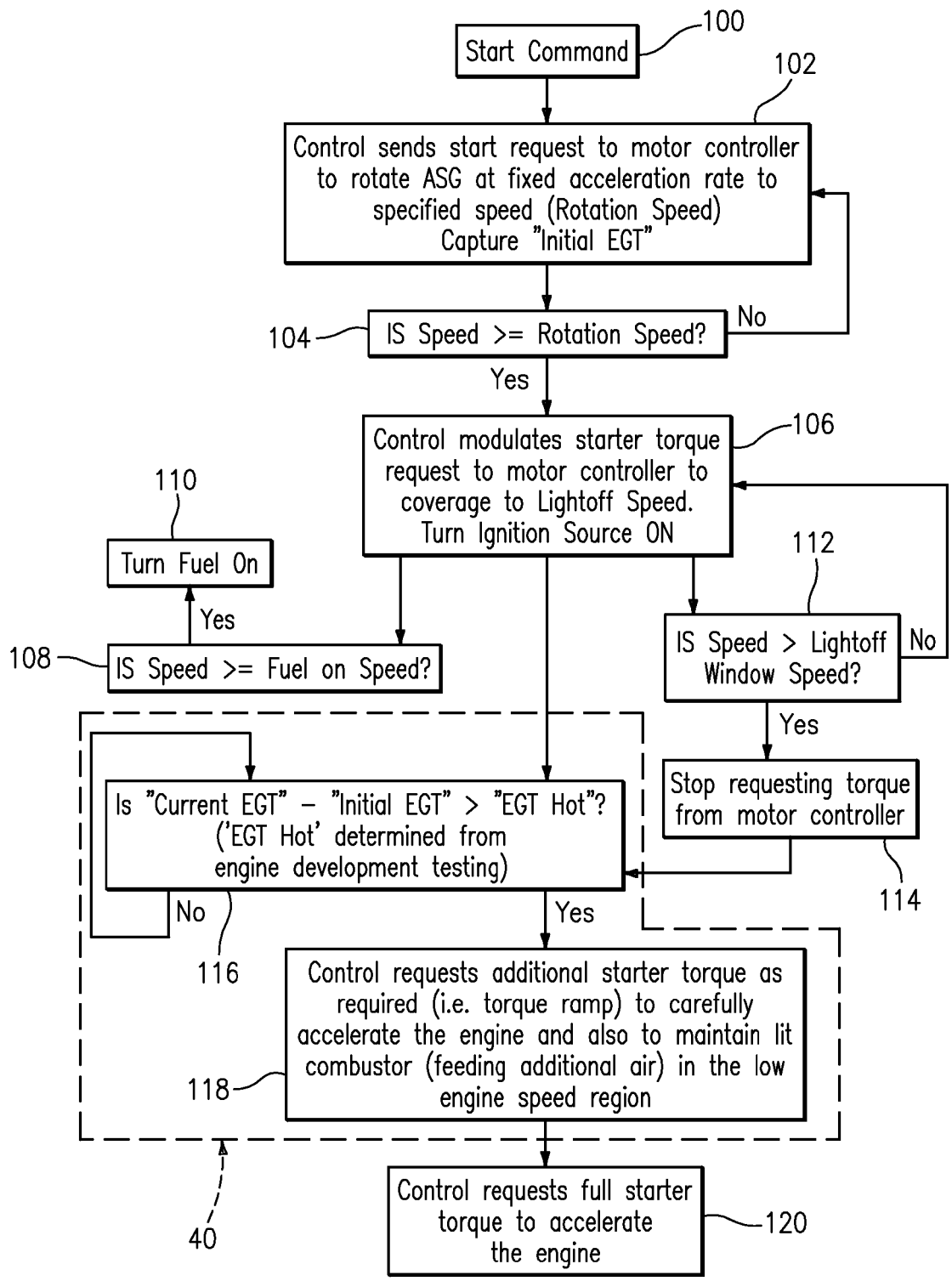
FIG. 2 is a flow diagram illustrating a start sequence with a warm-up module according to the present disclosure.
Figure 3:
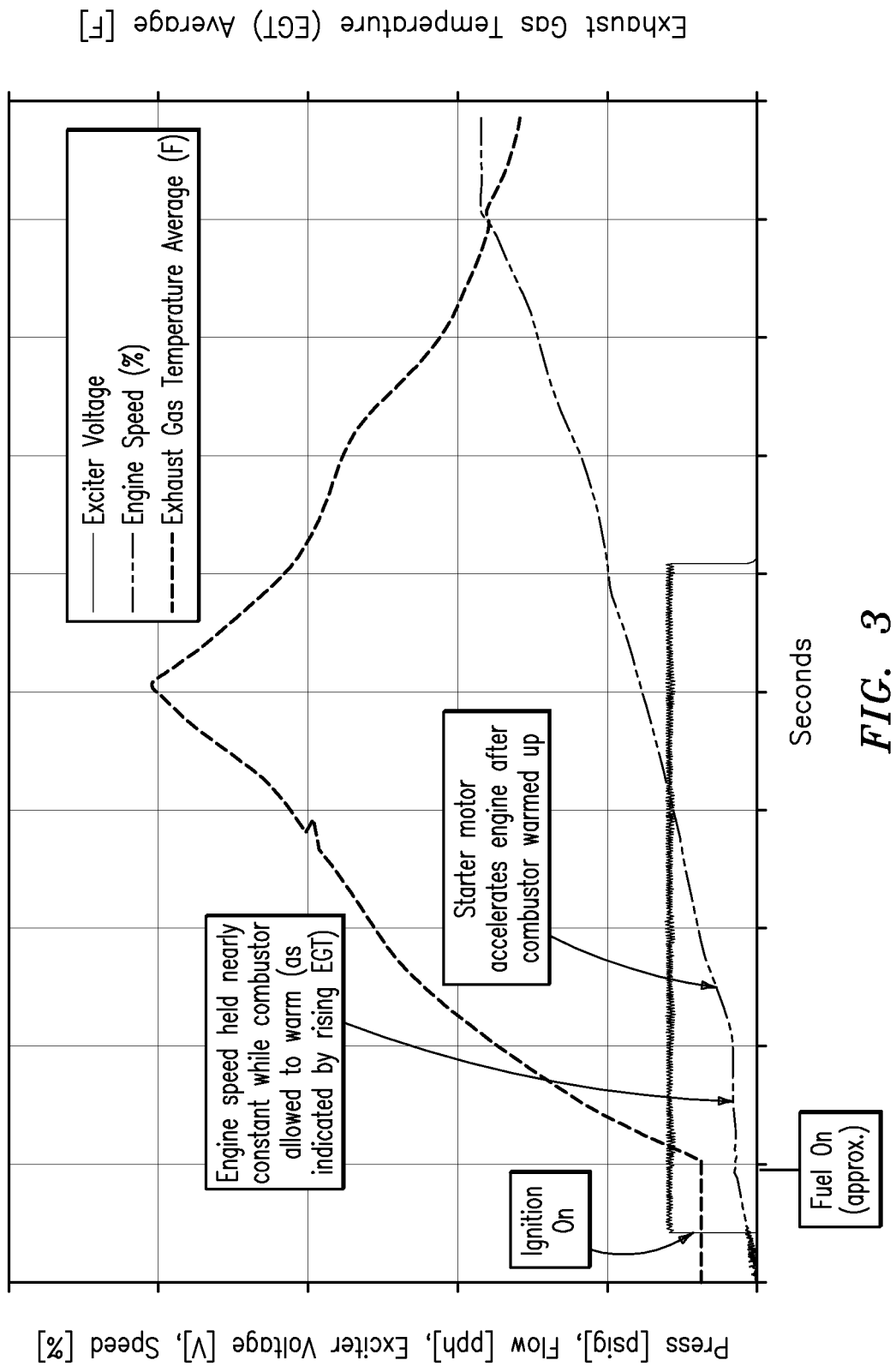
FIG. 3 is a graphical representation of a successful start cycle in accords with the sequence of FIG. 2 over a time cycle which approximates 3 minutes.

Referring to FIG. 2, a start sequence is initiated by a start command such as by actuation of the start switch 32 (Step 100). The starter system controller 18 commands the starter motor 24 to provide a controlled torque to the rotor 34 of the gas turbine engine 12. The gas turbine engine 12 is accelerated to a predetermined dwell speed for ignition. The range of engine speeds at which start is most likely to occur is referred to as the "light-off window" and typically ranges from 5%-20% of rated engine speed. In one non-limiting embodiment, the starter motor 24 drives the gas turbine engine 12 at 8% of rated engine speed for ignition which occurs in the disclosed non-limiting embodiment at approximately 62 seconds (FIG. 3). Once ignition occurs, the EGT begins to increase.

Figure 4:
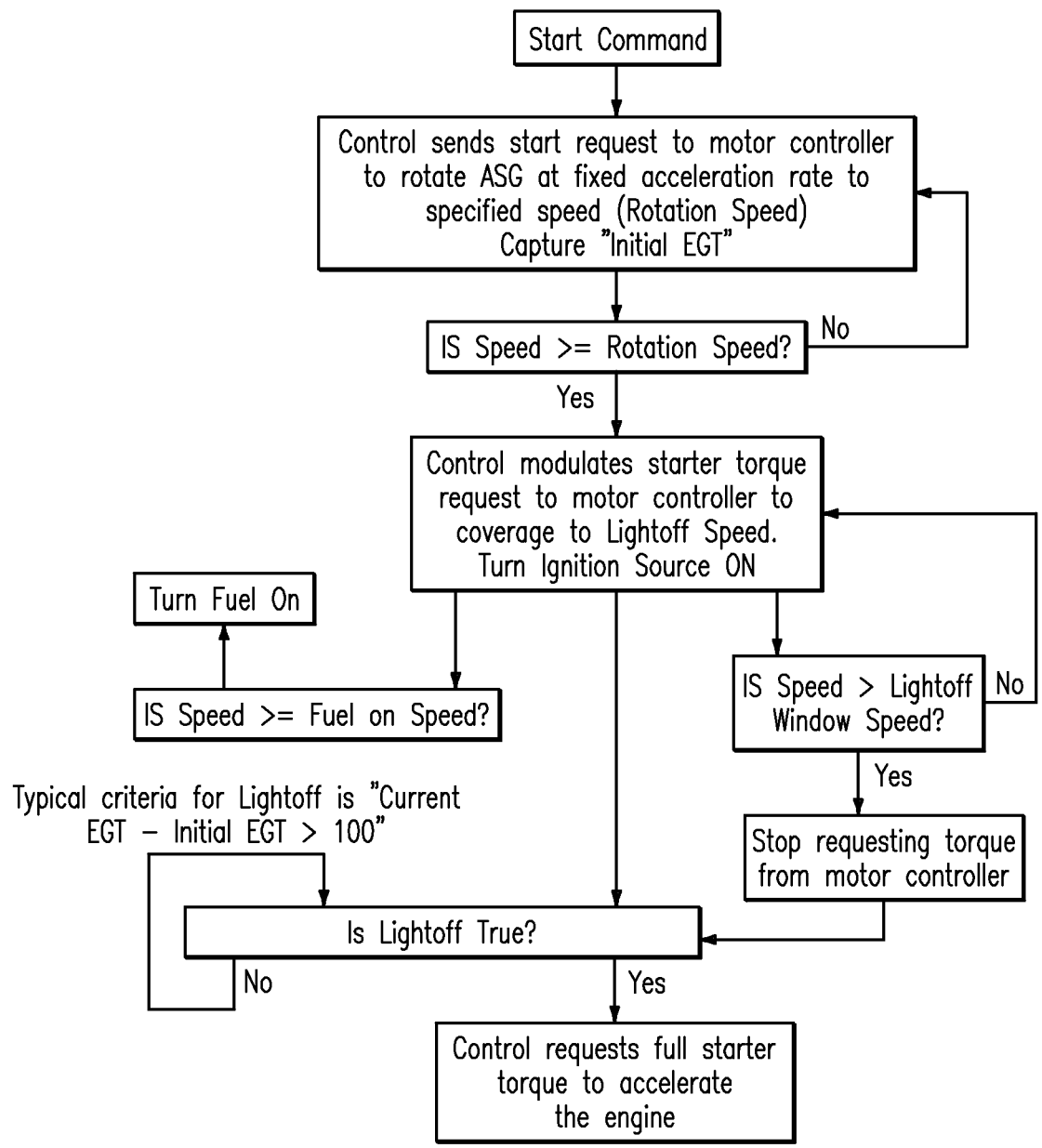
FIG. 4 is a RELATED ART start sequence.
Figure 5:
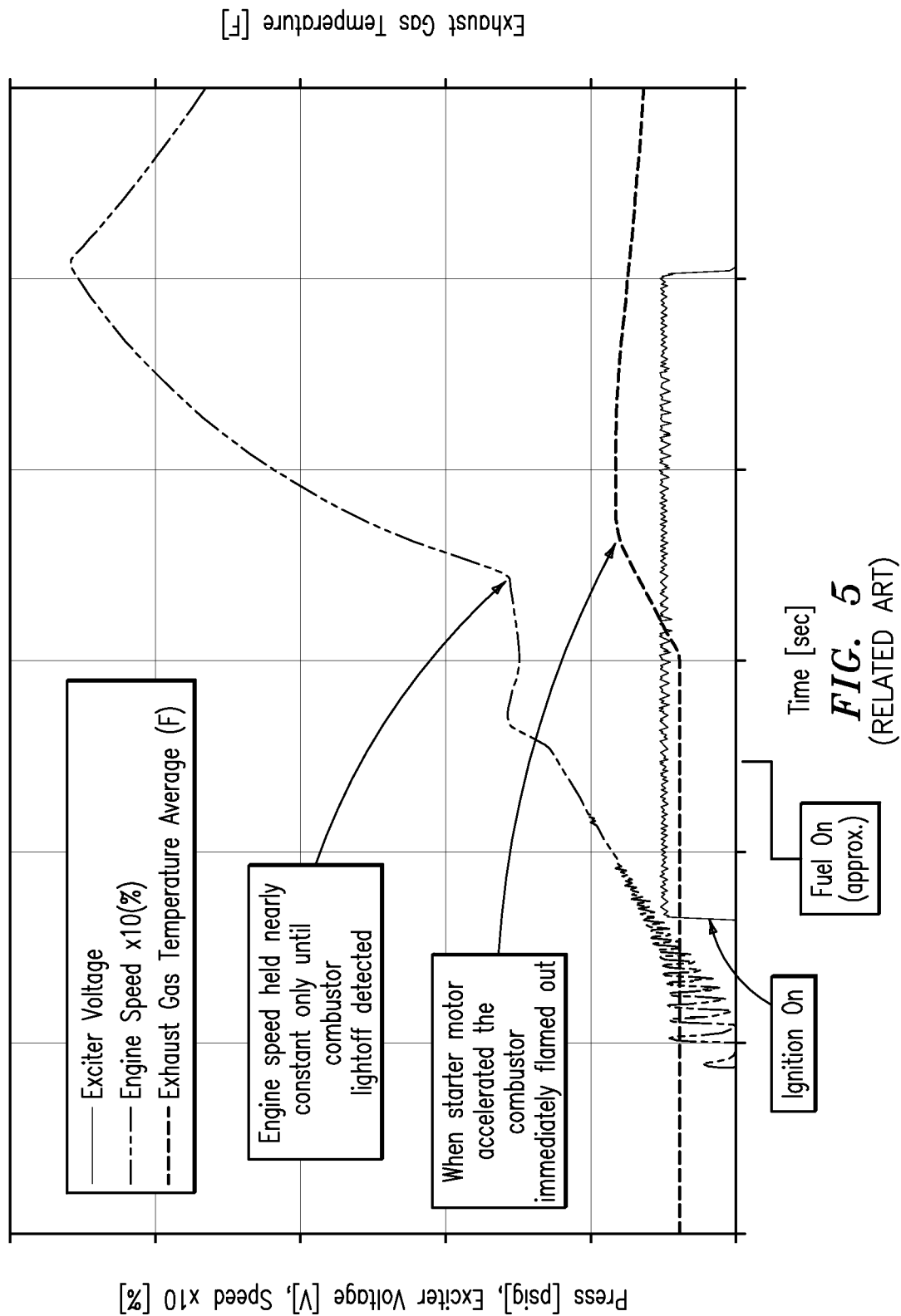
FIG. 5 is a RELATED ART graphical representation of a failed start cycle in accords with RELATED ART start sequence of FIG. 4 over a time cycle of less than 1 minute.

Rather than almost immediately accelerating the gas turbine engine as typical and suffering a potential flame-out (RELATED ART; FIGS. 4 and 5), the starter motor 24 is operated in response to a warm-up module 40.

The warm-up module 40 executes a warm-up cycle which is disclosed in terms of functional block diagrams. It should be understood by those skilled in the art with the benefit of this disclosure that these functions may be enacted in either dedicated hardware circuitry, programmed software routines capable of execution in a microprocessor based electronics control embodiment or other computer readable medium. In one non-limiting embodiment, the module 40 may be a portion of, any one of, or various combination of the controllers 18, 20, 22, as well as and other systems.

In operation, once the start sequence is initiated (Step 100), the starter system controller 18 commands the starter motor 24 to provide a controlled torque to the gas turbine engine 12 to a specified rotational or "dwell" speed (Step 102). Initially, the starter motor 24 drives the gas turbine engine 12 toward a predetermined engine rotational speed (Step 104). The time to achieve the predetermined dwell speed is graphically represented in FIG. 3 to begin at approximately 52 seconds, where FIG. 3 depicts an example start with combustor warm-up cycle for gas turbine engine 12 at high altitude (e.g., above 30,000 feet/9.144 km). As speed increases, the starter system controller 18 modulates the torque of the starter motor 24 to converge upon a light-off speed (Step 106). Once light-off speed is achieved, the ignition source is activated (exciter of FIG. 3). Gas turbine engine speed is continually monitored until a fuel on speed is reached at which time fuel is introduced to the combustor section 12M (Steps 108 and 110). Throughout the initial ramp up of gas turbine engine speed, the starter system controller 18 modulates the torque provided by the starter motor 24 so as to maintain gas turbine engine speed within the light-off window (Steps 112 and 114).

As illustrated in FIG. 3, the engine speed ramps up as the starter motor 24 begins to drive the gas turbine engine 12. Since the starter motor 24 provides the motive force, the exhaust gas temperature (EGT) of the gas turbine engine 12 remains approximately constant at approximately ambient air temperature until light-off. After light-off, EGT increases.

The warm-up module 40 controls the starter motor 24 to drive the gas turbine engine 12 at the predetermined dwell speed until a predetermined magnitude of combustor warm-up is achieved (Steps 116, 118). In one non-limiting embodiment, the predetermined magnitude of combustor warm-up is determined by an EGT increase such as, for example a 500° F. increase which provides the warm-up cycle for the combustor section 12M. Alternatively, or in addition thereto, other metrics for the predetermined magnitude of combustor warm-up may be utilized such as, for example, a time delay after light-off, or a fuel volume totalizer.

The warm-up module 40 thereby provides a warm-up cycle for the combustor section 12M to essentially allow the combustor section 12M to "bake" and avoid the potential for flame-out which may otherwise occur in a conventional start sequence (RELATED ART; FIG. 4) at approximately 23 seconds (RELATED ART; FIG. 5). Notably, in FIG. 5, flame-out occurs at approximately the same time at which the starter motor initiated acceleration after engine light-off is identified as typical of a conventional start sequence.

The warm-up module 40 may be operated only in specific areas of the operating envelope such as at high altitudes, for example, above approximately 30,000 feet to accommodate low air density and cold air temperatures. Alternatively, even at ground level, extreme cold temperatures may initiate usage of the warm-up module 40. As identified in Step 116, "current EGT" minus "initial EGT" being greater than a predetermined magnitude of warm-up may be utilized by the warm-up module 40. Once the predetermined magnitude of combustor warm-up is achieved, additional torque is applied through the starter motor 24 to begin acceleration of the gas turbine engine 12 yet assure continued combustor section 12M operation (Step 118). Although engine speed is held nearly constant, engine sped still generally drifts up as the starter motor 24 provides minimal torque as the gas turbine engine 12 becomes increasingly stable as the combustor section 12M warms. That is, eventually even with minimal torque application by the starter motor 24, the gas turbine engine 12 increases power output.

It should be understood that although the warm-up module 40 assures a successful start in heretofor adverse conditions, a slight increase in start time results such that it may be desirable to use the warm-up module 40 only under predetermined difficult engine start conditions such as, for example, the aforementioned high altitudes, low temperatures, and combinations thereof.

Once out of a low engine speed start region, the starter motor 24 is then commanded to provide full torque to rapidly accelerate the gas turbine engine 12 to a self maintaining operational speed (Step 120). Once the gas turbine engine has achieved the self-maintaining operational speed, typically approximately 50 percent of governed rotor speed, the starter motor 24 may be powered down. The gas turbine engine 12 then continues acceleration to a normal operating speed of 100 percent at which generator operation may begin. Control of the gas turbine engine may then transition to a constant speed mode where engine speed is constant.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of starting an auxiliary power unit comprising the steps of:
   (a) controlling a speed of a starter motor during a start sequence to drive the auxiliary power unit at a dwelling speed, the dwelling speed lower than an operating speed;
   (b) actuating an igniter in the start sequence to achieve light-off in a combustor of the auxiliary power unit;
   (c) maintaining the auxiliary power unit at the dwelling speed after light-off in the start sequence until an instant exhaust gas temperature (EGT) exceeds an initial EGT by greater than a predetermined magnitude with respect to avoiding flame-out upon acceleration of the auxiliary power unit from step (d); and
   (d) increasing the speed of the starter motor to accelerate the auxiliary power unit in the start sequence in response to achieving the predetermined magnitude, wherein the start sequence is initiated only in response to predetermined engine start conditions and another, different start sequence is initiated in response to being outside of the predetermined engine start conditions.

2. A method as recited in claim 1, wherein the start sequence is initiated only above a predetermined altitude.

3. A method as recited in claim 2, wherein the start sequence is initiated only above 30,000 feet.

4. A method as recited in claim 1, wherein the start sequence is initiated only below a predetermined ambient temperature.

5. A method as recited in claim 1, wherein increasing the speed of the starter motor continues until the auxiliary power unit is accelerated to a predetermined operating speed.

6. The method as recited in claim 1, wherein said step (d) comprises accelerating the auxiliary power unit at a first rate within a low engine speed range, and then accelerating the auxiliary power unit at a second, higher rate once the engine speed is out of the low engine speed range.

7. The method as recited in claim 6, including accelerating the auxiliary power unit at the second rate until a self-maintaining speed is achieved and then powering down the starter motor in response to the self-maintaining speed.

8. A method as recited in claim 1, wherein the start sequence is initiated in response to being above a predetermined altitude.

9. A method as recited in claim 1, wherein the start sequence is initiated in response to being below a predetermined ambient temperature.

10. A method of starting an auxiliary power unit comprising the steps of:
    (a) controlling a speed of a starter motor during a start sequence to drive the auxiliary power unit at a dwelling speed, the dwelling speed lower than an operating speed;
    (b) actuating an igniter in the start sequence to achieve light-off ignition in a combustor of the auxiliary power unit;
    (c) maintaining the auxiliary power unit at the dwelling speed after light-off ignition in the start sequence in accordance with a warm-up cycle that assures starting by avoiding flame-out upon acceleration of the auxiliary power unit from step (d), the warm-up cycle including one of a change in exhaust gas temperature, a predetermined time, and a predetermined fuel volume total; and
    (d) increasing the speed of the starter motor to accelerate the auxiliary power unit in the start sequence in response to completion of the warm-up cycle, wherein the start sequence is initiated only in response to predetermined engine start conditions and another, different start sequence is initiated in response to being outside of the predetermined engine start conditions.

11. A method as recited in claim 10, wherein the start sequence is initiated in response to being above a predetermined altitude.

12. A method as recited in claim 10, wherein the start sequence is initiated in response to being below a predetermined ambient temperature.

* * * * *